Aug. 26, 1952     J. C. MARSALA     2,608,013
ILLUMINATED LICENSE PLATE HOLDER
Filed July 9, 1948     2 SHEETS—SHEET 1
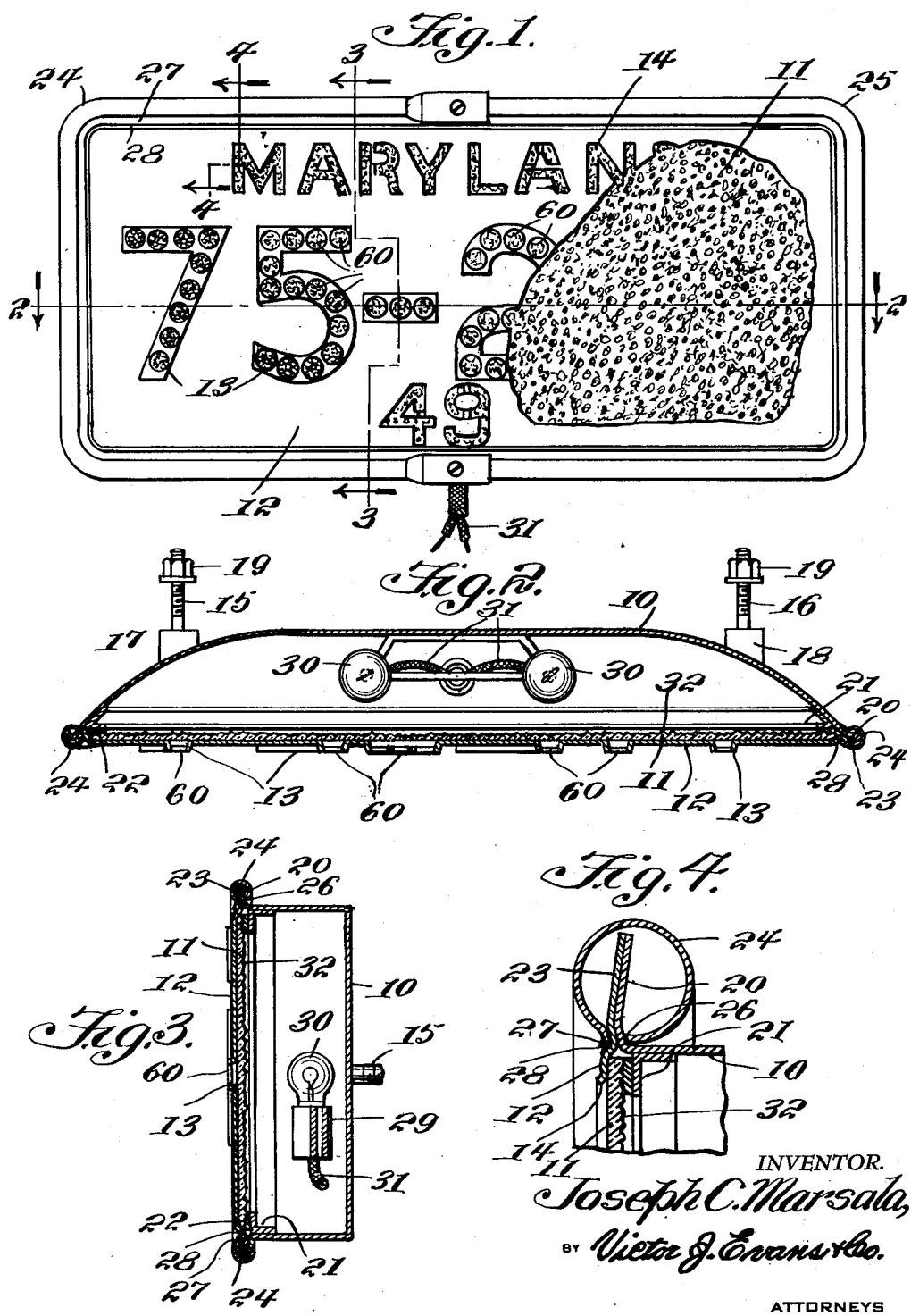
INVENTOR.
Joseph C. Marsala,
BY Victor J. Evans & Co.
ATTORNEYS Aug. 26, 1952     J. C. MARSALA     2,608,013
ILLUMINATED LICENSE PLATE HOLDER
Filed July 9, 1948     2 SHEETS—SHEET 2
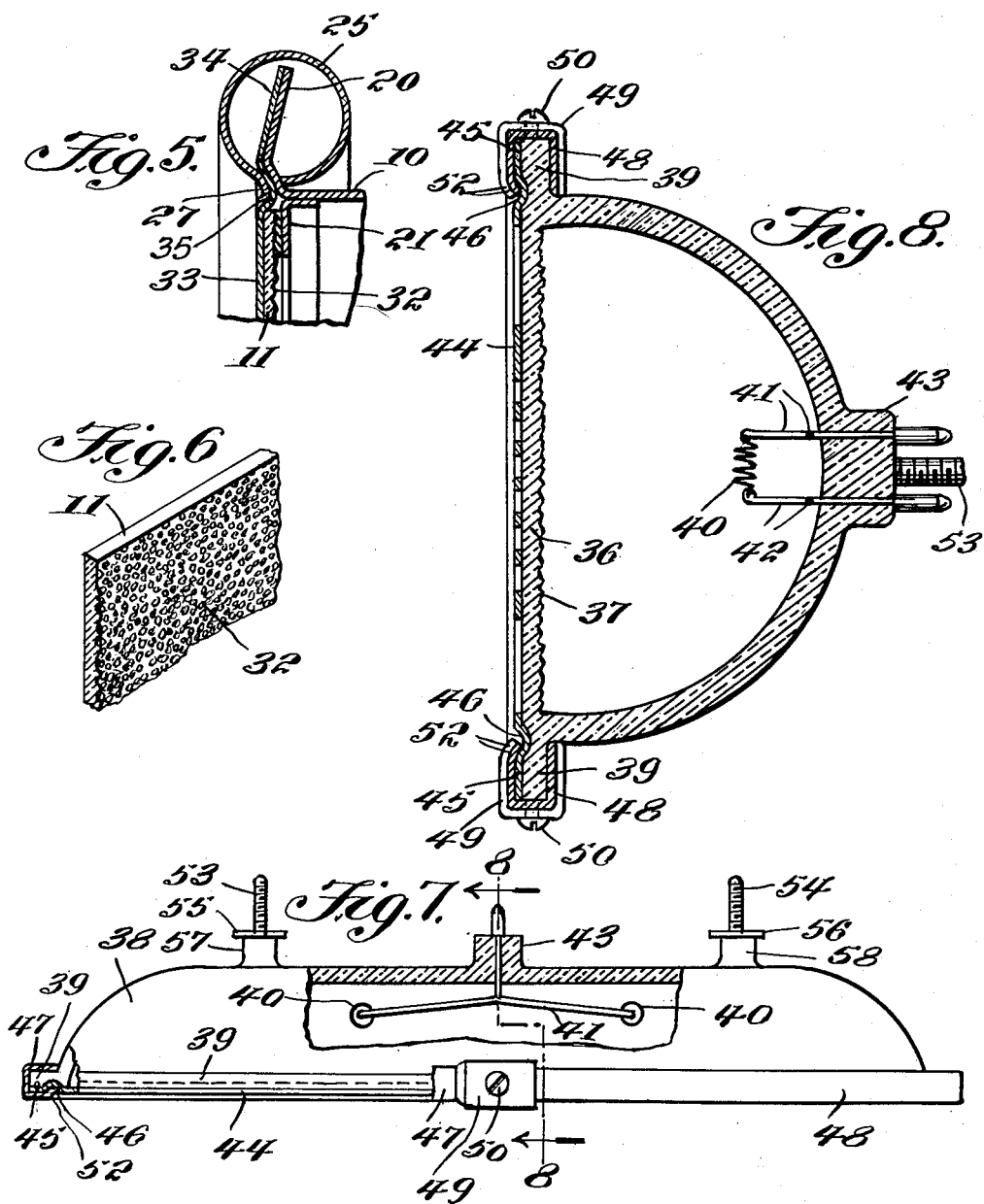
INVENTOR.
Joseph C. Marsala,
BY Victor J. Evans & Co.
ATTORNEYS Patented Aug. 26, 1952

2,608,013

UNITED STATES PATENT OFFICE 2,608,013

ILLUMINATED LICENSE PLATE HOLDER

Joseph C. Marsala, Watertown, N. Y.

Application July 9, 1948, Serial No. 37,854

1 Claim. (Cl. 40—133)

This invention relates to illuminated motor vehicle license plates and holders therefor which are adapted to mount the plates on the front or rear of the vehicle, and in particular a shallow box-like frame having supporting means at the back and lights therein and provided with a sand blasted front plate with a perforated license plate against the sand blasted plate.

The purpose of this invention is to provide an illuminated license plate wherein a soft diffused light shows through perforations in the numbers or lettering on the plate.

Various devices have been provided for illuminating license tags or plates of motor vehicles to facilitate reading the numerals or letters thereon in the dark, but these have not been satisfactory and are not universally used. With this thought in mind this invention contemplates an improved holder for perforated license plates and the like wherein the light rays are diffused by a glass plate having a sand-blasted inner surface. The sand-blasting forms little mounds on the surface of the glass and as the light rays strike the little mounds they bounce or are reflected from one to the other providing a more even distribution and more intense or stronger light rays pass through the glass.

The object of this invention is, therefore, to provide an improved illuminated license plate mounting in which the letters and numerals on the plate are readily discernible after dark.

Another object of the invention is to provide an improved illuminated license plate mounting that may readily be attached to substantially any motor vehicle.

A further object of the invention is to provide an improved mounting for illuminated license plates and the like which is of a simple and economical construction.

With these and other objects and advantages in view the invention consists of the new and useful combination, construction, and arrangement of parts as hereinafter more fully described, set forth in the claim appended hereto, and disclosed in the accompanying drawings forming part hereof, wherein:

Figure 1 is a view showing a front elevation of a license plate and a holder therefor with part of the glass plate shown through a broken away portion of the license plate illustrating the sand-blasting thereof.

Figure 2 is a cross section through the holder and plate taken on line 2—2 of Figure 1.

Figure 3 is a vertical section through the holder and plate taken on line 3—3 on Figure 1.

Figure 4 is a section through the upper rim of the holder taken on line 4—4 of Figure 1, and on an enlarged scale.

Figure 5 is a similar section showing a modification wherein the license plate is formed with extending flanges at the edges.

Figure 6 is a detail showing a section of the sand-blasted glass plate with parts broken away.

Figure 7 is a plan view of a holder of a modified design wherein part of the casing is broken away.

Figure 8 is a cross section through the casing shown in Figure 7, taken on line 8—8 thereof.

Referring now to the drawings wherein like reference characters denote corresponding parts the improved illuminated license plate holder of this invention includes a shallow box-like casing 10 having arcuate ends, a glass plate 11 having a sand-blasted inner surface, and a license plate 12 having perforated numerals 13 and letters 14.

In the design shown in Figures 1 to 4 the casing 10 is provided with mounting screws 15 and 16 secured in lugs 17 and 18, respectively, and provided with nuts 19, as shown in Figure 2. The side walls of the casing are provided with a continuous flange 20, as shown in Figures 4 and 6, and an angle 21 is provided around the inner surface to provide a stop for the glass plate 11. A gasket 22 is provided between the plate 11 and angle 21 and the license plate 12 is held against the plate 11 by a continuous frame 23 that is secured against the flange 20 by tubular U-shaped brackets 24 and 25. The inner edges of the brackets are formed with slots 26 and the outer edge is provided with a flange 27 that is positioned in a groove 28 in the frame 23. The bracket 24 is provided with enlarged ends in which the ends of the bracket 25 are held by screws, as shown.

The casing 10 is provided with sockets 29 for light bulbs 30 and the bulbs are connected by wires 31 to a suitable source of electric current.

The glass plate 11 is provided with a sand blasted inner surface 32, as illustrated in Figure 6, and it will be understood that any suitable transparent material may be used for the plate.

In the design illustrated in Figure 5, the casing 10 and tubular bracket 24 are the same as shown in Figure 4, and in this modification a license plate 33 is provided with an extending flange 34 which has a groove 35 therein similar to the groove 28 for receiving the flange 27 of the tubular bracket. The glass plate 11 is clamped against the angle 21 with the gasket 22 therebetween, as shown.

In the design shown in Figures 7 and 8, a plate 36 with a sand-blasted inner surface 37 is made integral with a casing 38 having flanges 39 at the edges and the light filaments 40 are provided on wires 41 and 42 extending through a boss 43 into the evacuated filament housing space within this integral structure. In this design a license plate 44 with extending flanges 45 having grooves 46 therein, is positioned against the outer surface of the plate 36 and secured in place by channel-shaped brackets 47 and 48 and with the ends of the bracket 47 formed with enlarged sections 49 in which the ends of the bracket 48 are held by screws 50. The outer flanges of the brackets may be provided with continuous lips 52 that are positioned in the grooves 46. The casing 38 is provided with mounting screws 53 and 54 having washers 55 and 56, respectively and the screws are mounted in bosses 57 and 58, respectively.

As shown in Figure 1 the numerals of the license plate are provided with perforations 60 through which the rays of light diffused by the sand-blasted inner surface of the plate 11 pass, and with the parts arranged in this manner the numerals and lettering on the plate are readily discernible from a considerable distance in the dark.

It will be understood that the illuminated license plate container or holder of this invention may also be used for street names on corner posts, and furthermore, it is adapted to be incorporated in or to form an integral part of the structural body of a motor vehicle with the proper opening or insert in the structure of the body. The body itself provides a container to house the license plate, with the proper mechanical parts adapted to the body. The shape and mechanical parts may be especially adapted to the contour and shape of each designed body. Each body may become an illuminated locked license plate container.

It will be understood that other modifications may be made in the design and arrangement of the parts without departing from the spirit of the invention.

What is claimed is:

An illuminated holder for mounting a motor vehicle registration plate having selective light transmitting areas and of uniform size and marginally deformed to provide an indented peripheral groove at its front face and a corresponding projecting marginal rib on its back face, comprising a single integral molded glass structure having a back and side walls, a substantially flat translucent front wall integral therewith, a peripheral flange extending marginally of said front wall and outstanding beyond said side walls and integral with said walls, said integral front wall and flange conforming in size and shape to the registration plate to be mounted thereon, and said flange having a marginal groove in its front face complementary to said marginal bead for positioning said registration plate thereon, and having a cross section at said marginal groove thinner than that of a portion of said flange outwardly spaced therefrom, said integral molded glass structure providing between said integral front and back walls an evacuated chamber, an incandescent filament mounted in the evacuated chamber in said integral structure and having terminals projecting through said integral back wall, and said holder further comprising channel shaped retaining means associated with said marginal flange for securing the registration plate to the flat translucent wall of said integral structure to be illuminated thereby, said channel means having an inturned front marginal edge for snapping into the marginal deformation or groove of the registration plate for securing said channel means to said plate and flange against all but forcible removal.

JOSEPH C. MARSALA.

REFERENCES CITED

The following references are of record in the file of this patent:

UNITED STATES PATENTS

| Number | Name | Date |
|---|---|---|
| 1,422,480 | Rutherford | July 11, 1922 |
| 1,606,323 | Shankman | Nov. 9, 1926 |
| 1,614,955 | Haupt | Jan. 18, 1927 |
| 1,665,276 | Pfeifer | Apr. 10, 1928 |
| 1,667,126 | Martin | Apr. 24, 1928 |
| 1,672,565 | Giordano | June 5, 1928 |
| 1,739,441 | Clark | Dec. 10, 1929 |
| 1,821,420 | Caccamo | Sept. 1, 1931 |
| 1,977,261 | Brown | Oct. 16, 1934 |
| 2,045,863 | Marsala | June 30, 1936 |